Aug. 12, 1947.  J. B. LOVICK  2,425,381
CONCENTRIC THREAD GAUGE
Filed March 28, 1944

INVENTOR.
JOHN B. LOVICK
BY
James M. Abbett
ATTY.

Patented Aug. 12, 1947

2,425,381

UNITED STATES PATENT OFFICE 2,425,381

CONCENTRIC THREAD GAUGE

John B. Lovick, Glendale, Calif., assignor to Allied Appliance Co., Los Angeles, Calif., a co-partnership comprising William P. Todd and Milton C. Miller, Jr.

Application March 28, 1944, Serial No. 528,458

4 Claims. (Cl. 33—199)

This invention relates to a testing instrument, and particularly pertains to a concentric thread gauge.

In the manufacture of various machine parts, such for example as threaded sleeve nuts used in hydraulic couplings or in packing glands, it is necessary to machine the parts with sufficient accuracy to insure that the thread is concentric with other bores of the part, and it is desirable to provide means by which the degree of eccentricity may be quickly and precisely ascertained. It is the principal object of the present invention, therefore, to provide a gauge for testing threaded parts which is designed to permit the parts to be quickly associated with the gauge or removed therefrom for inspection purposes, and to easily and accurately determine the relative concentricity of different bores in the machined part which are designed to have a common longitudinal axis.

The present invention contemplates the provision of a supporting structure having an expanding mandrel upon which a machined part may be centered and with relation to which it may be rotated, and a responsive member contacting a bore of said machined part as the part is rotated, whereby variations in concentricity of the bore centered upon the mandrel and the bore engaged by the responsive member may be transmitted to a precision gauge for measurement and visual indication.

The invention is illustrated by way of example in the accompanying drawings in which:

Fig. 4 is an enlarged fragmentary view showing the manner in which the supporting mandrel engages the threads of a work piece.

Figure 5:
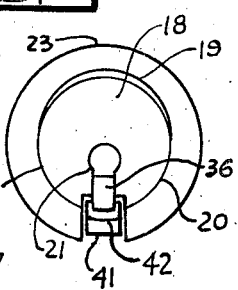
Fig. 5 is a view in end elevation showing the work receiving end of the mandrel.

Referring more particularly to the drawings, 10 indicates a work piece which has been machined and which is here shown as having a threaded bore 11, at the end of which is a smooth bore 12. It is desired to maintain the concentricity of the threaded bore with relation to the smooth bore within very fine limits of tolerance. This is difficult, due to the fact that the tap used in cutting the threads 13 within the threaded bore 11 may be worn or improperly sharpened so that the bottom of the thread groove will not be properly cut or the point of the thread may be improperly formed. It may also occur that the bottom of the thread groove, indicated at 14, or the point of the thread, indicated at 15, may be rough, although the contiguous walls 16 of the thread groove will be smooth and of proper shape and dimensions. It is desirable, therefore, to use the circumferential pitch line of the thread, indicated at P in Fig. 4 and which is intermediate the outside diameter and the root diameter of the thread, as a bench mark for gauge measurements. Thus, in the present case the work piece 10 is mounted upon a mandrel 17. This mandrel has an outer portion 18, which is formed with a threaded length 19. The threads are mutilated so that they only occur along a portion of the circumference of the top of the mandrel, as indicated in Fig. 5. The remaining circumference of the mandrel, as indicated at 20, is of a diameter approximating the root diameter of the thread and is smooth. Referring to Fig. 4, attention is called to the fact that the thread 19 does not exactly mate with the thread 13 but that the points or outer circumference of the threads forming the part 19 are cut off, as indicated at 15', so that they will not extend entirely into the bottom of the groove 14, and that furthermore, the threaded section 19 is formed with thread grooves which are undercut to clear the points of the thread, as indicated at 14'. A relatively small face 16' coincides in angle with the faces 16 of the threads 13. The face 16' intersects the circumferential pitch line P so that the mandrel only contacts with the faces 16 of the threads 13 along the relatively narrow area 16'. A downwardly extending radial slot 21 is formed through the mandrel and receives elements to be hereinafter described. The mandrel is also formed with a relatively large diameter 22 which fits within a bore 23 of a standard 24 carried upon a base plate 25. The mandrel portion 22 is here shown as being cylindrical and held in place by a set screw 26. It will be recognized that mandrels 17 may be made of different diameters and interchanged by loosening the set screw 26 to permit them to be removed and replaced.

Mounted at the top of the standard 24 is a horizontally extending supporting bracket 27 which carries a precision gauge 28. This gauge is provided with a dial 29 having graduations thereon calibrated to decimal parts of an inch.

Figure 1:
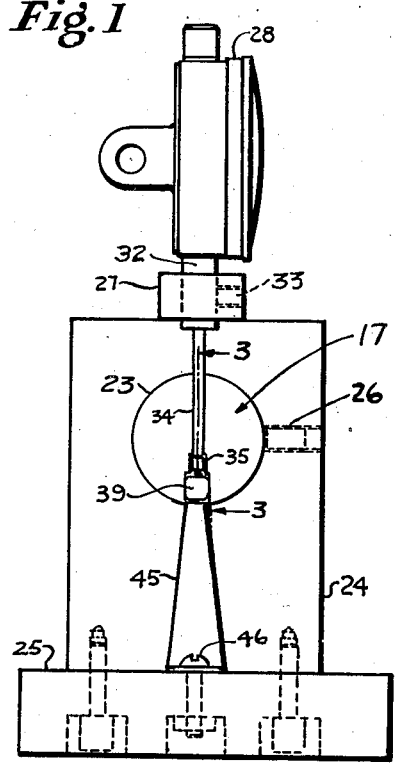
Figure 1 is a view in end elevation showing the gauge with which the present invention is concerned.
Figure 2:
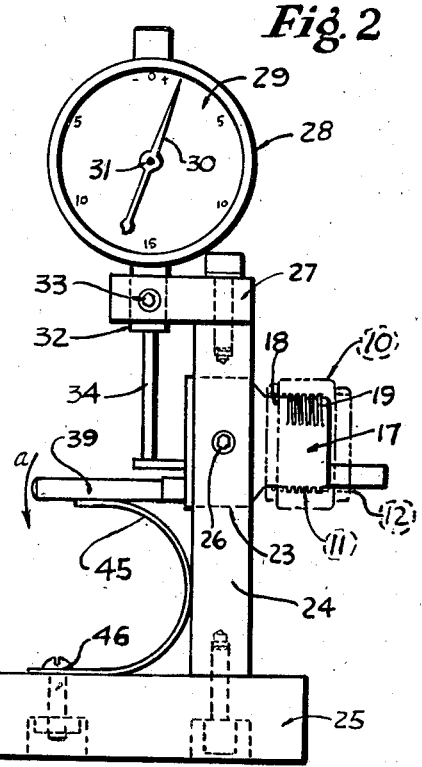
Fig. 2 is a view in side elevation showing the gauge structure and indicating a work piece thereon by dotted lines.
Figure 3:
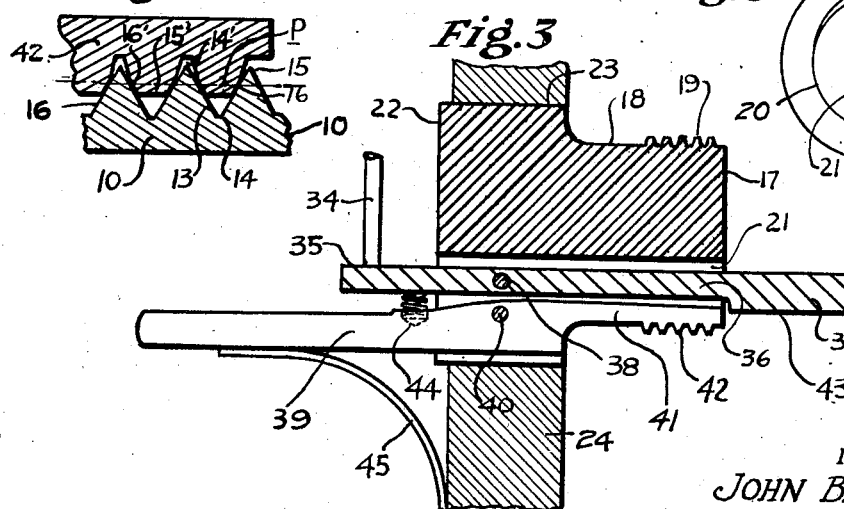
Fig. 3 is an enlarged view in central vertical section through the work receiving portion of the gauge, as seen on the line 3—3 of Fig. 1.

A gauge hand 30 is mounted upon a center pin 31 and swings over the face of the gauge. A sleeve portion 32 forming a part of the gauge case extends downwardly through a bore in the bracket 27 and is secured by a set screw 33. Extending downwardly through the sleeve 32 and reciprocating longitudinally thereof is a gauge spindle 34. This spindle rests upon a lever arm 35 which extends through the slotted opening 21 in the mandrel and is formed integral with a lever arm 36 having a gauge finger 37 at its free end. The members 35 and 36 are mounted upon a pivot pin 38 which extends transversely of the slot 21 in the mandrel. A lever 39 is disposed beneath the lever 35 and is mounted upon a pivot 40 extending transversely of the mandrel 17. This lever is formed with a forwardly projecting lever arm 41 carrying a thread gauge finger 42. The thread gauge finger is formed with thread sections made in the same manner as described in connection with the threads 19 on the mandrel 18, as shown in Fig. 4 of the drawings. The pitch of the threads on the finger 42 agrees properly with the pitch of the threads 19 on the mandrel section 18 so that when the threads 11 of the work piece 10 are engaged the work piece may be rotated and screwed onto the threads in the same manner as would be the case if the threads were continuous. Since both of the lever structures extend longitudinally of the slot 21 in the mandrel and are intended to have independent movement relative to each other, there is clearance between the contiguous faces of the two levers. By reference to Fig. 3, it will be seen that the lever arm 41 is shorter than the lever arm 36, and that a gauge edge 43 of the finger 37 overhangs the end of the lever arm 41. This is for a purpose to be hereinafter described. Interposed between the lever arms 35 and 39 is a helical spring 44 which tends to swing the lever arm 39 upwardly and the finger 37 downwardly. A leaf spring 45 is secured by a bolt 46 to the base 25 and extends upwardly and beneath the lever arm 39. This tends to urge the threaded portion 42 of the lever arm 41 downwardly.

In operation of the present invention the gauge is constructed as shown in the drawings and an appropriate mandrel 17 is selected to accommodate the piece of work 10 which is to be inspected. The springs 44 and 45 tend to urge the gauge finger 37 and gauge finger 42 downwardly. When the work piece 10 is to be tested pressure is applied to the end of the lever 39 in the direction of the arrow a, and this will act to swing the thread gauge finger 42 upwardly until its upper face engages the lower face of the lever 36, at which time the outer gauge finger 37 will be swung upwardly. These fingers will move upwardly in the slot 21 of the mandrel section 18 until it is possible for the threaded bore 11 and the smooth bore 12 to move onto the mandrel until the threaded bore 11 is in register with the threaded section 19 of the mandrel, and the smooth bore 12 is in register with the face 43 of the finger 37. Pressure is then released upon the lever arm 39 so that the spring 45 will swing the thread gauge finger 42 downwardly into mesh with the threads 13 of the bore 11. The spring 44 will swing the gauge finger 37 downwardly until the gauge face 43 of the finger rests against the smooth bore 12 of the work piece. When this takes place the yieldable action of spring 45 will exert a pressure to hold the threads 13 down against the thread sections 19 on the top of the mandrel. It should be explained that the relieved portions 20 on opposite sides of the mandrel make it possible for the work piece 10 to be slipped onto the mandrel easily without having to be screwed into place. When the work piece has been seated on the mandrel it is preferable that the precision gauge 28 shall be in adjustment to cause its hand 30 to stand in register with zero on the dial face 29 in the event the bore 12 of the work piece is concentric with the threaded bore 11. The work piece is then rotated on the mandrel and will move therealong due to the engagement of threads 19 on the mandrel 17 and threads 42 on the gauge finger with the threads 13 in the threaded bore of the work piece. As the work piece 10 is rotated and screwed along the threads the edge 43 of the gauge finger 37 will ride over and bear against the surface of the bore 12. If there is variation in the concentricity of the bore 12 with the threads at their pitch circle, indicated in Fig. 4 at P, this variation will be indicated by movement of the hand 30 over the dial 29 of the precision gauge 28. If the variation exceeds the plus or minus tolerance the piece is rejected, otherwise it is passed.

It will thus be seen that the testing gauge here shown is simple and rugged in construction, that it may be quickly manipulated to place a work piece in position for inspection, and to remove it therefrom, and that it may be operated by unskilled persons who are not versed in the use of a micrometer. Furthermore, it is evident that a test is made for concentricity of longitudinally aligned bores which would be very difficult to make otherwise, and that this test can be made regardless of whether or not the thread contour is absolutely perfect.

While the invention has been explained as being used in testing a work piece having a threaded bore and a smooth bore, it is understood that modifications in the device might be made to accommodate machined pieces of various designs, and that furthermore, the quick interchange of mandrels makes it possible to accommodate work pieces having bores of different diameters.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A gauge for testing relative eccentricity of a threaded bore and another longitudinally aligned bore within a machined part, which comprises a support, a fixed mandrel carried thereby having thread portions on one side of the axis thereof agreeing in number and pitch with the threads in the bore of the work piece and also agreeing in pitch diameter therewith, whereby when the work piece is mounted on said mandrel the pitch diameters of the threads on the mandrel and the threads on the bore of the work piece will be coincident, a gauge finger pivoted for radial swinging movement on the mandrel and extending into the other bore of the work piece and contacting with the bore surface thereof opposite to that engaged by said threaded portions whereby relative eccentricity between the threaded bore and the other bore will cause movement of the finger as the work piece is rotated.

2. The structure of claim 1 including a precision gauge associated with said pivoted finger for indicating the relative amount of eccentricity between the two bores.

3. The structure of claim 2 wherein the mandrel is formed with a radially movable threaded section, the threads agreeing in shape with that of the fixed threads on the mandrel.

4. A gauge for measuring relative eccentricity between a threaded bore and a smooth bore longitudinally aligned within a work piece, which gauge comprises a supporting upright, a fixed mandrel mounted thereon and projecting from a face of said upright, said mandrel having a portion carrying partial circumferential lengths of threads of a pitch and number agreeing with those of a work piece to be tested, and a radially movable section diametrically opposed to said first named threaded section carrying lengths of similar threads, means yieldably urging said movable section outwardly whereby the work piece may be positioned over the mandrel and the threads of the mandrel and the movable section will mate with the threads of the work piece, a gauge finger carried by the mandrel and movable radially thereof to contact the other bore of the work piece and being disposed to engage said work piece upon the diametrically opposite side from the point of engagement with the mandrel threads, means yieldably urging said gauge finger to its operative position, and a precision gauge associated with the gauge finger to indicate relative eccentricity of the two bores when the work piece is rotated on the threaded portion of the mandrel.

JOHN B. LOVICK.

REFERENCES CITED

The following references are of record in the file of this patent:

UNITED STATES PATENTS

| Number | Name | Date |
|---|---|---|
| 1,996,092 | Albertson et al. | Apr. 2, 1935 |
| 1,961,647 | Sonoda | June 5, 1934 |
| 2,200,181 | Lamond | May 7, 1940 |

FOREIGN PATENTS

| Number | Country | Date |
|---|---|---|
| 441,343 | Great Britain | Jan. 20, 1936 |
| 376,586 | Italy | Nov. 18, 1939 |